United States Patent [19]

Willis et al.

[11] 4,342,319
[45] Aug. 3, 1982

[54] COMBINED CHOPPER AND IMPELLER FOR AN AXIAL FLOW COMBINE

[75] Inventors: Billy B. Willis; L. Michael Fetters, both of Independence, Mo.

[73] Assignee: Allis-Chalmers Corporation, Milwaukee, Wis.

[21] Appl. No.: 220,355

[22] Filed: Dec. 29, 1980

[51] Int. Cl.³ .............................................. A01F 12/40
[52] U.S. Cl. .................................. 130/27 R; 130/27 P; 130/27 T
[58] Field of Search ................. 130/27 R, 27 S, 27 L, 130/27 E, 27 P, 27 T; 241/101.7, 222, 243; 56/14.6

[56] References Cited

U.S. PATENT DOCUMENTS

| | | | |
|---|---|---|---|
| 510,253 | 12/1893 | Gustafson | 130/27 S |
| 1,110,768 | 9/1914 | George | 130/27 P |
| 1,222,730 | 4/1917 | Bunting | 130/27 E |
| 1,864,033 | 6/1932 | Wettlauffer | 130/27 E |
| 2,150,856 | 3/1939 | Williams | 130/23 |
| 2,281,846 | 5/1942 | Klein | 130/27 R |
| 2,292,650 | 8/1942 | Oehler et al. | 130/27 R |
| 2,626,159 | 1/1953 | Thompson | 130/27 S |
| 2,956,602 | 10/1960 | Gronberg | 241/243 |
| 3,005,637 | 10/1961 | Hetteen | 130/27 L |
| 3,350,017 | 10/1967 | Howell et al. | 241/243 |
| 3,375,738 | 4/1968 | Love | 130/27 R |
| 3,392,769 | 7/1968 | Gronberg | 241/243 |
| 3,430,633 | 3/1969 | Mark | 130/27 R |
| 3,543,487 | 12/1970 | Bodine | 56/14.6 |
| 3,599,407 | 8/1971 | Bichel | 56/14.6 |
| 3,670,739 | 6/1972 | Rowland-Hill | 130/27 T |
| 3,703,802 | 11/1972 | Wriestler et al. | 56/14.6 |
| 3,874,604 | 4/1975 | Gronberg et al. | 241/243 |
| 4,218,022 | 8/1980 | Boehm et al. | 241/243 |

FOREIGN PATENT DOCUMENTS 901908 6/1972 Canada ............................. 130/27 S Primary Examiner—Paul J. Hirsch
Attorney, Agent, or Firm—Charles L. Schwab

[57] ABSTRACT

An axial flow combine with a transverse rotor (18) employs a combined impeller and chopper (66) having knives which strip crop material from a rotor discharge paddle impeller (34), chop it in cooperation with selectively retractible blades (96) and throw it rearwardly through a discharge passageway (56) to a downwardly opening discharge (57). The chopper (66) may be driven at either one of two speeds and eliminates the need for the usual impeller employed to move crop material from the threshing rotor discharge impeller (34) to the rear discharge (57) of the combine.

7 Claims, 4 Drawing Figures

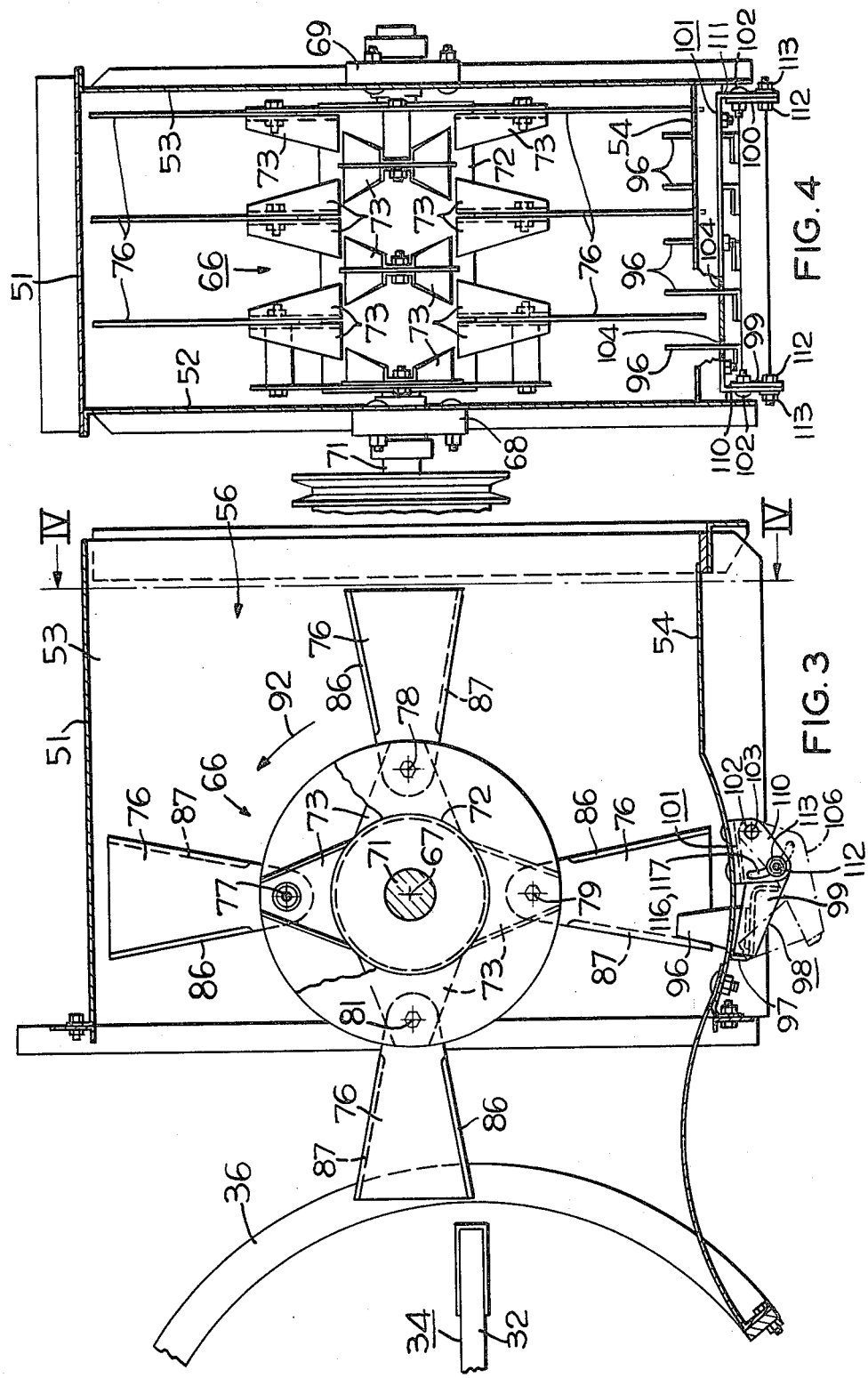

COMBINED CHOPPER AND IMPELLER FOR AN AXIAL FLOW COMBINE

BACKGROUND OF THE INVENTION

Technical Field

This invention relates to agricultural harvesting equipment, and more particularly, to a combined chopper and impeller for an axial flow combine.

Prior Art

U.S. Pat. No. 2,281,846 illustrates a combine in which a straw chopper is interposed between the straw walker and the straw spreader.

U.S. Pat. No. 2,626,159 illustrates a combine wherein straw delivered by an endless belt conveyor and rotary feeder is cut by a rotary chopper, in cooperation with an adjustable concave having cutter bars, and is spread by a divider and deflector fingers.

In U.S. Pat. No. 2,150,856, a rotating cleaner is disposed beneath the discharge end of the threshing cylinder concave and has beater arms which swing upwardly through slots in the tail end of the concave. The cleaner rotates opposite the direction of rotation of the threshing cylinder.

The axial flow combine of U.S. Pat. No. 3,670,739 includes an impeller which throws the straw discharged from two threshing rotors to a rear mounted straw chopper. Vanes on a vane bearing member at the rear discharge disperse or spread the chopped material.

SUMMARY OF THE INVENTION

A combined chopper and impeller at the paddle discharge of an axial flow threshing rotor, and rotating in the same direction, strips the discharged crop material from the rotor paddles, chops it and throws it rearwardly to a discharge opening where a spreader may be employed for dispersion of the chopped crop material over a desired width of ground. An adjustable knife concave is preferably provided with transversely spaced knives extending upwardly through longitudinal slots in the floor beneath the chopper.

By replacing the impeller heretofore used at the paddle discharge of the axial flow rotor with a combined chopper and impeller of this invention, the discharged crop material can be chopped to improve its spreadability, reduce interference with tillage operations and speed up decomposition. Also, the stripping action of the combined chopper and impeller unit is improved over that of an ordinary impeller.

BRIEF DESCRIPTION OF THE DRAWINGS

One embodiment of the invention is shown in the drawings in which:

FIG. 3 is a view taken on the line III—III in FIG. 2; and

FIG. 4 is a view taken along the line IV—IV in FIG. 3.

DETAILED DESCRIPTION OF THE DRAWINGS

Figure 1:
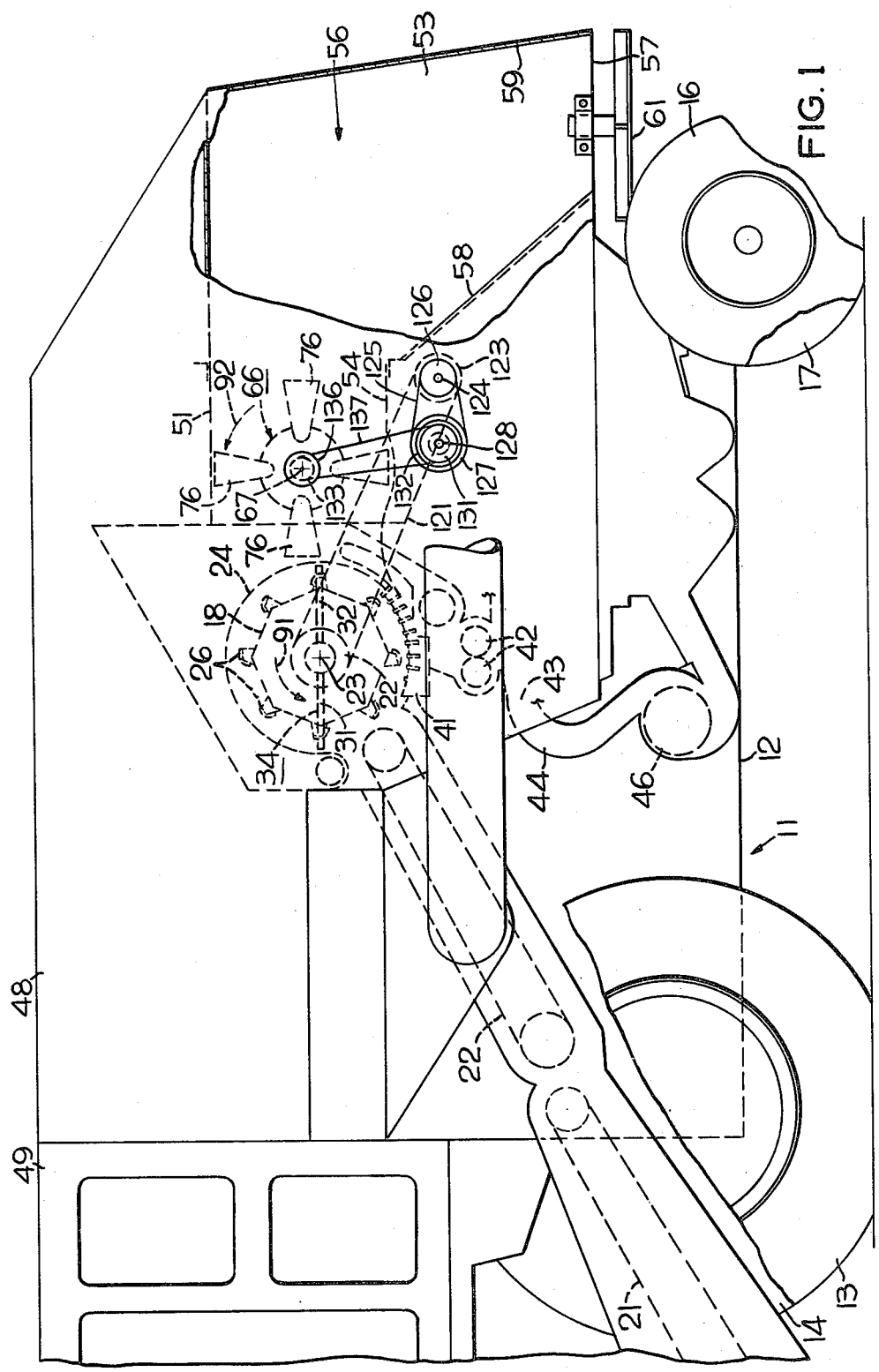
FIG. 1 is a partial side view of an axial flow combine in which the present invention is incorporated.
Figure 2:
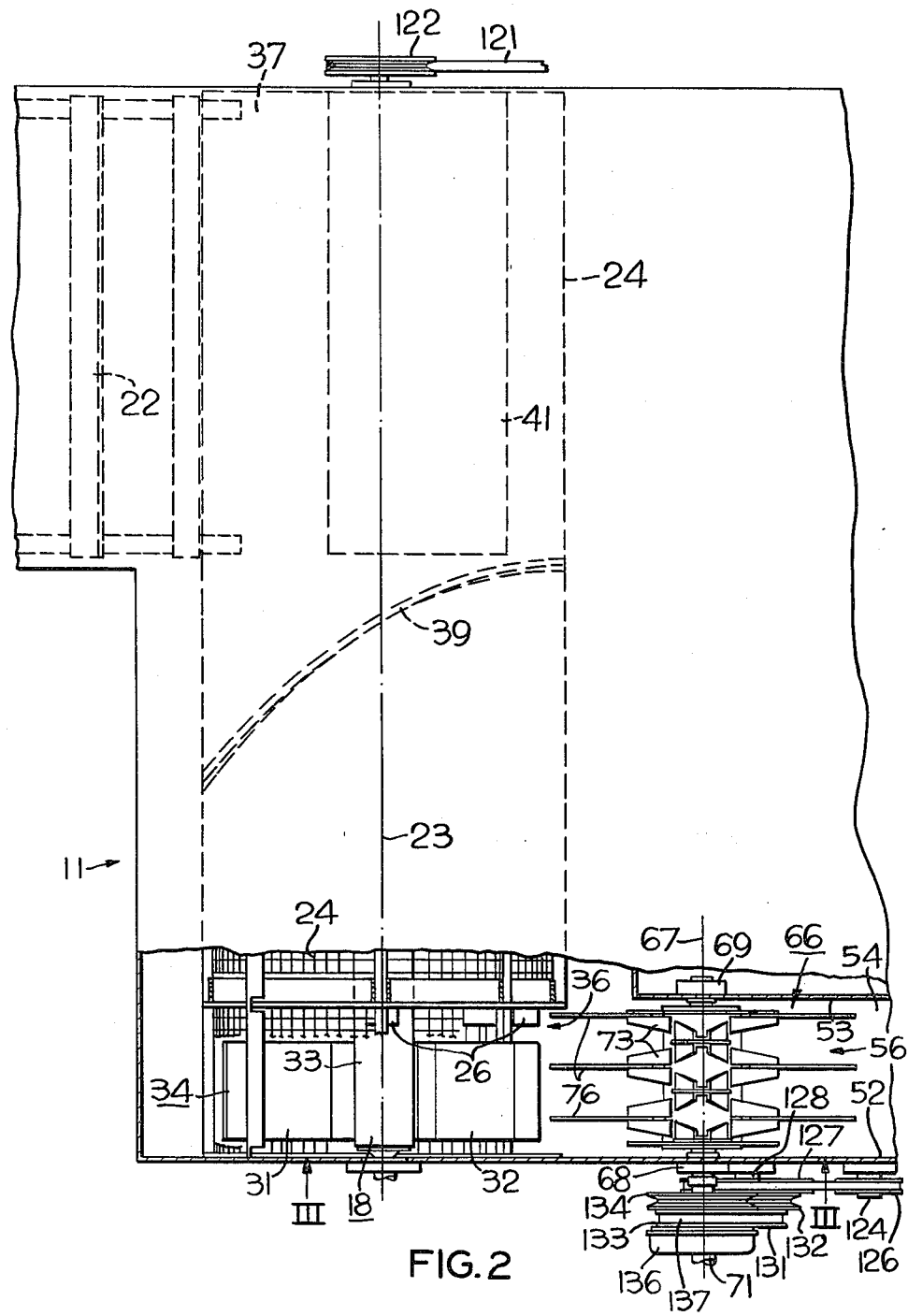
FIG. 2 is a partial top view of the combine shown in FIG. 1 with parts broken away for illustration purposes.

This invention has particular utility in an axial flow combine of the type illustrated in FIGS. 1 and 2 of the drawings. The axial flow combine 11 includes a main frame 12 supported at its front end by a pair of engine driven drive wheels 13, 14 and at its rear end by a pair of steerable wheels 16, 17. Crops cut by a header, not shown, are conveyed to an axial flow threshing rotor 18 by a pair of slat feeders 21, 22. The rotor rotates about a transverse axis 23 within a foraminous cage 24 and includes axially extending threshing bars 26 which extend from the right end of the rotor 18 to near the left end of the rotor where a pair of radially extending flat elements or paddles 31, 32 are secured at the rotor shaft 33 to form a paddle impeller 34 operable to centrifugally impel and discharge threshed crop material, from which the seed kernels have been separated, rearwardly through a radial opening 36 in the cage 24. Crop material is fed by slat feeder 22 to the interior of the transverse cage 24 through a radial opening 37 in the cage and moved axially by a series of helical ribs 39, only one of which is shown, on the interior of the cylindrical cage wall. A concave 41 is disposed in underlying relation to the rotor 18 in the left part of the axial flow threshing and separating mechanism. The kernels of grain are separated from the stalks by the cooperative action of the rotor 18 and the cage 24 and pass through the concave 41 and the radial openings in the cage 24. The grain and other small particles are fed to a pair of accelerator rolls 42 which accelerate the separated material downwardly across a horizontal layer of air discharged rearwardly from the opening 43 of an air passageway 44 by a transverse flow fan 46. The rearwardly directed air blows the chaff and other lightweight particles rearwardly from the combine and the kernels and heavy particles fall to the shoe assembly, not shown in detail, from whence the clean grain is conveyed to the grain bin 48 behind the operator's cab 49. The axial flow combine, thus far described, is like that shown in U.S. Pat. No. 4,007,744.

Referring also to FIGS. 3 and 4, a top wall 51, a pair of transversely spaced side walls 52, 53 and a bottom wall 54 define the front portion of a longitudinally extending passageway 56 which extends from adjacent the opening 36 in the cage 24 to a vertically downward rear discharge opening 57 defined by the bottom edges of the side walls 52, 53, a downwardly and rearwardly sloping portion 58 of the bottom wall 54 and a generally upright rear wall 59. A rotary spreader 61 is mounted on the rear of the combine to spread discharged crop material.

A combined impeller and chopper 66 is rotatably mounted on a transverse axis 67 parallel to the rotor axis 23 by a pair of bearings 68, 69 mounted on the side walls 52, 53. The chopper 66 includes a shaft 71 having a drum or cylinder portion 72 to which knife mounting brackets 73 are welded. A plurality of vertically disposed knives 76 are pivotally connected to their respective mounting brackets 73 by pivot bolts aligned on four transverse parallel axes 77, 78, 79, 81 which are equally spaced from one another and from the chopper axis 67. Each knife is disposed in a vertical longitudinal plane, has a leading cutting edge 86, a trailing cutting edge 87 and is free to swing about its pivot axis within the limits imposed by the shaft portion 72 and other components of the chopper 66. The dual cutting edges 86, 87 permit the knives to be reversed so the trailing edge becomes the leading edge.

During a harvesting operation, the chopper 66 and the rotor 18 are rotated in the same direction, that is they are both rotated counterclockwise as viewed from the left side of the combine, as shown in FIG. 1 and as indicated by the arrows 91, 92. The knives 76 strip away any crop material that hangs onto the radially outer ends of the paddle elements 31, 32 and cuts the crop material discharged rearwardly from the cage opening 36 by the rotating paddle impeller 34 into the longitudinally aligned passageway 56. The cutting action of the chopper 66 is enhanced by use of a series of longitudinally extending and transversely spaced blades 96. The blades 96 are so positioned as to be parallel to and out of registration with the knives 76 of the chopper 66. The blades 96 are rigidly secured to a Z-shaped portion 97 of a blade support 98 which has a pair of vertically disposed end plates 99, 100 pivotally connected by a pair of aligned pivot bolts 102 to downwardly extending legs 110, 111 of a bracket 101 secured to the underside of the bottom wall 54. The blades 96 and their support 98 pivot about the transverse axis 103 of the pivot bolts 102 between a raised position, shown in solid lines in FIG. 3, in which the blades extend through a series of longitudinally extending, transversely spaced, vertical opening slots 104 and a lowered or retracted position, as shown in broken lines 106, in which the blades 96 are withdrawn from the passageway 56. In their illustrated operating position shown in full lines in FIGS. 3 and 4, the blades 96 are in lapping relation to the knives 76 thereby insuring a good cutting or shredding action on discharged crop material. The blade support 98 is releasably secured in a selected position of pivotal adjustment by releasable fastening means in the form of bolts 112 and nuts 113. The bolts 112 extend through arcuate slots 116, 117 in the legs 110, 111 of the bracket 101, the slots permitting pivotal adjustment of the blade support 98 upon loosening of the nuts 113.

The rotor 18 is driven by a belt 121 engaging a pulley 122 on the rotor 18 and a pulley 123 on an engine driven jack shaft 124. The chopper 66 is driven through a selective speed drive train which includes a first endless belt drive having a belt 125 engaging a pulley 126 on the jack shaft 124 and a pulley 127 on an intermediate shaft 128. A second drive is provided, in series with the first drive, and includes a pair of stepped diameter pulleys 131, 132 on shaft 128 in aligned relation to a pair of stepped diameter pulleys 133, 134 on the chopper shaft 71, a magnetic clutch 136 and a belt 137 which is shown in power transmitting engagement with pulleys 133 and 131. A slower chopper speed can be obtained by placing the belt 137 on pulleys 134 and 132. Having a magnetic clutch in the chopper drive train permits the chopper 66 to be selectively disconnected, such as when the rotor 18 is not driven.

The chopper 66 not only chops the crop material discharged by the paddle impeller 34 of the axial flow combine rotor 18, but also throws or impels the chopped material rearwardly to the downwardly opening discharge 57 without need of a separate impeller. Thus, the chopper 66 also acts as an impeller and can properly be referred to as a combined chopper and impeller. The knives 76 effectively strip material clinging to the ends of the paddles 31, 32 and chop the discharged material to the desired size by adjustment of the position of the blades 96 and through selection of the chopper speed. The transverse spacing of the knives and blades across the transverse width of the discharge passageway 56 insures uniform chopping or cutting action on the discharged crop material.

The embodiments of the invention in which an exclusive property or privilege is claimed are defined as follows:

1. An axial flow combine having a foraminous cylindrical cage whose axis is transverse to the direction of travel of the combine during a harvesting operation having a rearward facing, radial discharge opening adjacent one axial end and a rotor within and generally coextensive and coaxial with the cage including a discharge paddle at the end thereof registering generally with the discharge opening in the cage whereby the paddles centrifugally impel crop material rearwardly through the discharge opening, said combine further characterized by:

top, bottom and side walls defining a longitudinally extending passageway between said discharge opening in said cage and a downward facing discharge opening at the rear end of the combine, and
    a chopper mounted on said combine at the entrance of said passageway adjacent said cage discharge opening for rotation about a transverse axis and having a plurality of radially extending knives disposed at axially spaced intervals across the transverse width of said passageway, said chopper rotating in the same direction as said rotor whereby said knives strip crop material from said paddles, chop it and impel it rearwardly to said rear end discharge opening.

2. The combine of claim 1 and further comprising vertical blades at the bottom wall of said passageway beneath said chopper and spaced at intervals in the transverse direction so as to be out of registration with said knives.

3. The combine of claim 2 wherein said bottom wall beneath said chopper presents a series of longitudinally extending, transversely spaced vertical opening slots through which said vertical blades extend.

4. The combine of claim 3 and further comprising a blade support mounting said blades and pivotally mounted on said combine on a transverse pivot axis for swinging movement between a first position in which said blades extend through said slots and cooperate with said knives to cut discharged crop material and a second position in which said blades are substantially withdrawn downwardly through said slots.

5. The combine of claim 4 including means selectively securing said blade support in positions of pivoted adjustment between and including said first and second positions of adjustment.

6. The combine of claims 1, 2, 3, 4 or 5 and further comprising an engine-driven shaft, a drive train between said engine-driven shaft and chopper and a clutch in said drive train.

7. The combine of claim 6 wherein said drive train includes means by which a change of speed is obtainable.

* * * * *